US006712275B1

(12) United States Patent
Borg

(10) Patent No.: US 6,712,275 B1
(45) Date of Patent: Mar. 30, 2004

(54) UPC IDENTIFICATION DEVICE

(75) Inventor: James C. Borg, Eugene, OR (US)

(73) Assignee: Targus Fly and Feather, LLC, Eugene, OR (US)

( * ) Notice: Subject to any disclaimer, the term of this patent is extended or adjusted under 35 U.S.C. 154(b) by 0 days.

(21) Appl. No.: 10/364,013

(22) Filed: Feb. 10, 2003

(51) Int. Cl.[7] .............................................. G06K 19/00

(52) U.S. Cl. .......................... 235/487; 283/74; 283/80; 283/81; 340/568.2

(58) Field of Search ........................... 235/487; 283/74, 283/80, 81; 340/568.2

(56) References Cited

U.S. PATENT DOCUMENTS 4,631,845 A * 12/1986 Samuel et al. ................ 40/638
5,018,286 A * 5/1991 Zahner ........................ 40/665
5,104,148 A * 4/1992 Neal ........................... 283/81
5,560,657 A * 10/1996 Morgan ....................... 283/80
5,587,703 A * 12/1996 Dumont ................... 340/568.2
6,116,653 A * 9/2000 Oberholzer et al. .......... 283/74

* cited by examiner

*Primary Examiner*—Thien M. Le
*Assistant Examiner*—Daniel Hess
(74) *Attorney, Agent, or Firm*—Robert D. Varitz, P.C.

(57) ABSTRACT

A UPC identification device for affixation to a product includes a label-bearing portion having a side bearing UPC information; and a tail portion fixed to said label-bearing portion and extending outwardly therefrom for attaching the identification device to a product. The tail portion is held in place by expanding the distal portion thereof, or by forming the tail portion into a loop for capturing the label-bearing portion thereof.

11 Claims, 1 Drawing Sheet

Fig. 1
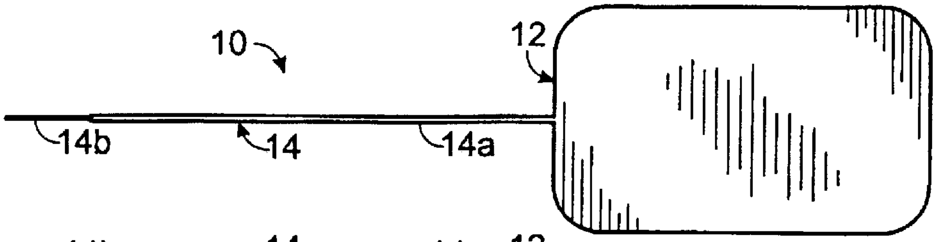
Fig. 2
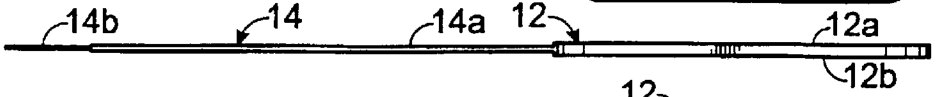
Fig. 3
Fig. 4
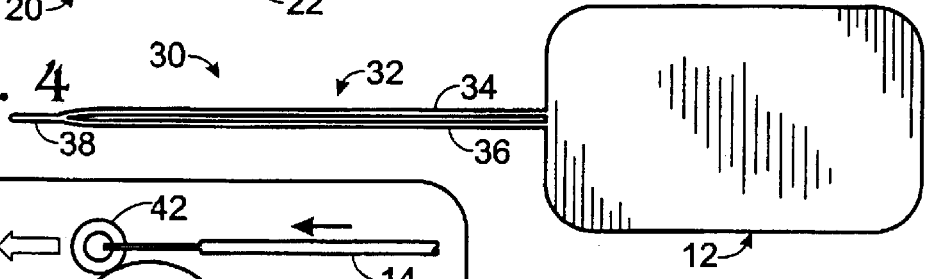
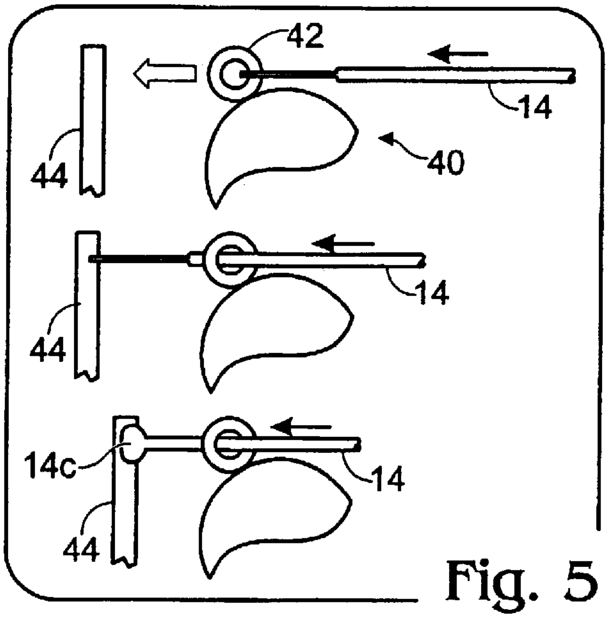
Fig. 5
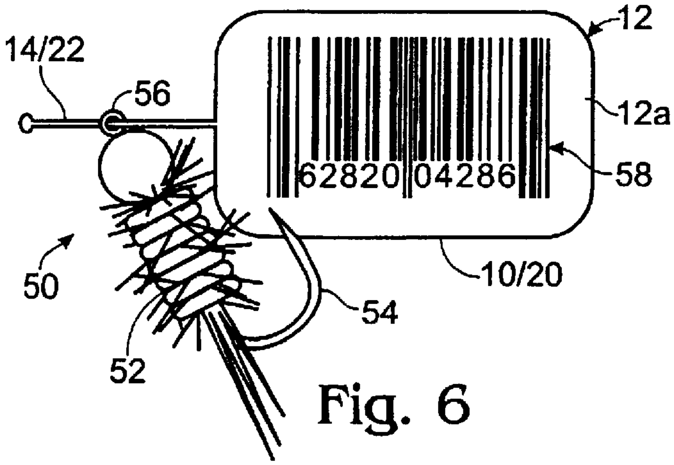
Fig. 6
Fig. 7
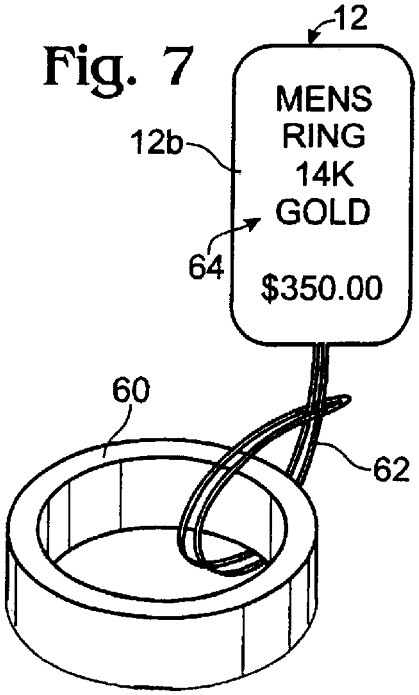

UPC IDENTIFICATION DEVICE

FIELD OF THE INVENTION

This invention relates to UPC barcodes and information labels, and specifically to information labels for UPC bar codes and information which may be affixed to small objects.

BACKGROUND OF THE INVENTION

The Universal Product Code (UPC) was the first widely adopted bar code symbology. In 1973, the grocery industry established UPC as the standard bar code symbology for product marking. The UPC not only speeds customer check-out at the time of purchase, it provides inventory control, and, in the case of retail establishments that identify customers through various membership schemes, provides information about individual customer buying habits. By 2005, all US retailers will have to be able to scan all UPC article numbers (8, 12, 13 and 14-digit). UPC symbols are fixed in length, can only encode numbers, and are continuous symbologies using four element widths. UPC version A symbols have 10 digits plus two overhead digits. The first overhead digit of a UPC version A symbol is a number related to the type of product. The UPC symbology was designed to make it ideal for coding products. The UPC symbol is decoded by measuring the distance from leading edges to leading edge of bars, trailing edge to trailing edge of bars and leading edge to leading edge of characters. Because UPC is a continuous code with exacting tolerances, it is more difficult to print on any equipment except printing presses, however, modem laser printers may be used to print UPC information on a variety of label materials.

Product codes and their respective manufacturers are available to all persons, and facilitate ordering of product by product type, model and manufacturer. If someone is opening up a sporting goods store, for example, it would save a lot of work to have a database of all the product numbers of the products carried by the store with their descriptions. The store, of course, will still have to enter the selling price for each product. The second reason for such a list is to identify the company that made the product. World Wide Web sites are available which provide product descriptions for all UPC-encoded products. Suppliers of products will generally provide their UPC product codes in a database which may be downloaded or provided on some form of computer-readable media.

An issue which has existed since the beginning of widespread UPC use is that many objects do not lend themselves to application of a label carrying the UPC. Such objects are generally of small size, and are not individually packaged. Bulk items commonly found at sporting goods stores and hardware stores, such as fishing flys, fishing sinkers, bolts, nuts, etc., would have a significant price increase to the consumer if such products had to be individually packaged in materials which could carry the required UPC information. Consumers also need to know what they are buying, and the provision of product information on a label carrying the UPC is of benefit to consumer and retailer alike, in that the consumer can read the information without the need to question a store employee.

A known form of identification device uses a tag having a T-bar tail portion, which is inserted into a product by aligning a T-shaped portion with a tail portion, and allowing the T-shaped portion to return to a 90° orientation to a tail portion once the tag is installed. This arrangement, however, will not work on products which have very small eyes, such as fish hooks.

Many products are sold in specialty stores in bulk, i.e., a consumer selects the products which are desired to be purchased, possibly placing the products in a bag, and writing the price of the product on the bag. Product SKU numbers may be provided by the individual retailer for inventory control and pricing. While this technique may reduce the product price to the consumer, there are issues of consumer counting of product and providing the proper product information. If a customer counts out 25 of a product, but miscounts and really has 27 items, a clerk is unlikely to catch the error. While this is a small matter with one customer, it becomes a major source of revenue loss with thousands of customers.

Another form of retailer that deals with small items is jewelry stores. Such stores generally apply price and product information on small tags which are fastened to the product by string or by a plastic insert, which holds two sides of a tag together. The tag, in the case of a ring or ear rings, must be removed before the product may be tried-on by the customer. The tag must then be re-applied.

The provision of an easily applied label which contains UPC information and product information is of benefit to retailer and consumer.

SUMMARY OF THE INVENTION

A UPC identification device for affixation to a product includes a label-bearing portion having a side bearing UPC information; and a tail portion fixed to said label-bearing portion and extending outwardly therefrom for attaching the identification device to a product. The tail portion is held in place by expanding the distal portion thereof, or by forming the tail portion into a loop for capturing the label-bearing portion thereof.

It is an object of the invention to provide an identification device which is affixable to small objects for displaying product information and UPC information.

Another object of the invention is to provide an identification device which is easy to affix to individual products.

A further object of the invention is to provide an identification device which may be affixed by a variety of affixation techniques.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 1 is a top plan view of a first embodiment of the identification device of the invention.

FIG. 2 is a side elevation of the device of FIG. 1.

FIG. 3 is a side elevation of a second embodiment of the device of the invention.

FIG. 4 is a top plan view of a third embodiment of the device of the invention.

FIG. 5 depicts steps in the affixation of the first and second embodiments of the device of the invention to a product.

FIG. 6 depicts the first and second embodiments of the device of the invention as affixed to a product displaying UPC information on a first side of a label-bearing portion thereof.

FIG. 7 depicts the embodiment of the invention of FIG. 4 as affixed to a product, displaying product information on a second side of a label-bearing portion thereof.

DETAILED DESCRIPTION OF THE PREFERRED EMBODIMENTS

Referring initially to FIGS. 1–4, three embodiments of the invention are depicted. The embodiments are provided to facilitate application of the identification device of the invention to various products, depending on product configuration. As previously noted, bulk items and small items are particularly difficult to price and track.

Referring now to FIGS. 1 and 2, two views of the identification device of the first embodiment of the invention are depicted, generally at 10. Device 10 includes a label-bearing portion 12, having a first side 12*a* and a second side 12*b*, and a tail portion 14. Label bearing portion 12, also referred to herein as a tag portion, is provided in a size which is sufficient to allow application of UPC information which may be read by the usual scanning devices found in retail stores. In the preferred embodiment, tag portion 12 has a generally rectangular, planar shape, and is approximately 0.7 inches long and 0.4 inches high. It has a nominal thickness of 0.02 inches. Device 10 is formed of a polymer material, such as nylon, and may be provided in a clear, translucent or opaque form.

Tail portion 14, in the preferred embodiment, extends from a side of tag portion 12, and is co-planar therewith. Tail portion 14 has a nominal diameter along a proximal portion 14*a*thereof of approximately 0.02 inches, which diameter narrows and is reduced along a distal portion 14*b* thereof to approximately 0.01 inches. Tail portion 14 has a nominal length in this embodiment of approximately 1.125 inches, with proximal portion 14*a* extending for approximately one inch, and distal portion 14*b* extending for approximately 0.125 inches. Tail portion may also be formed with a 0.01 inch diameter and a distal portion which has a diameter smaller than 0.01 inch.

FIG. 3 depicts a second embodiment 20 of the identification device of the invention, which is substantially similar to the embodiment of FIGS. 1 and 2, except that a tail portion 22 is of uniform diameter along its length. Tail portion 22, in this embodiment has a nominal length of approximately 0.75 inches. The diameter of tail portion 22 may be 0.01 inches or 0.02 inches, depending on the intended use of the device.

FIG. 4 depicts a third embodiment 30 of the identification device of the invention, which includes tag portion 12 and a tail portion 32. Tail portion 32 includes a first tail portion 34 and a second tail portion 34, which are slightly spaced apart from one another, and a distal joiner 38 which joins the first and second tail portions. The overall length of tail portion 32 is approximately 1.25 inches in this embodiment, with distal joiner 38 occupying approximately 0.1 inches at the end of the tail portion. The first and second tail portions have a nominal diameter of 0.02 inches, corresponding to the thickness of tag portion 12.

In order to secure devices 10 or 20 to a product 40, and now referring to FIG. 5, the tail portion is passed through the product, in this case, through an eye 42 which is part of the product, and expanded into an expanded tail portion 14*c*. As shown in the drawing, an expanding mechanism, specifically a heated element 44 is provided, which will cause the polymer of device 10 or 20 to expand, thereby capturing the product eye, and preventing removal or escape of device 10 or 20 from product 40. Expansion may be accomplished by any number of techniques, including heating, crimping, flaring, spreading, etc.

The selection of identification device 10 or 20 is dependent on the size of the orifice in a product eye. For example, in the case of fly fishing hooks, hook sizes 24 to 18 have and internal eye diameter of between about 0.01 inch and 0.02 inch. Hook sizes 16 to 6 have an internal eye diameter of about 0.02 to 0.04 inches, while hook sizes 4 to 4/0 have an internal eye diameter of at least about 0.04 inches and larger. Thus, the embodiment of device 10 having a 0.01 inch tail portion and a further reduced distal portion is suitable for use with hooks of size 24–18, while other embodiments having a single tail portion may be selected for larger hooks. For hooks of size 4 and larger, any embodiment, including embodiment 30 may be selected. Devices 10 and 20 may also he used on fabric or webbed products, wherein the tail is passed through an opening in the weave and then expanded. This replaces the well known T-bar tail arrangement used on clothing items.

FIG. 6 depicts device 10 or 20 as affixed to a fishing fly 50, which fly includes a fly body 52, and a fish hook 54, having an eye 56 therein. First side 12*a* of tag portion 12 is depicted with UPC information 58 carried thereon. UPC information may be affixed in any number of ways, including direct printing on the tag portion, printing on a label which is affixed to the tag portion, or the UPC information may be embossed into the identification device during tag formation, particularly if a large number of identification devices are going to be made for a specific product.

FIG. 7 depicts the affixation of identification device 30 to a ring 60. This embodiment may be affixed to a product by passing the tail portion through the product, spreading the first and second tail portions apart, and passing tag portion 12 through the spread of first tail portion 34 and second tail portion 36, which form a loop, thereby retaining the identification device on the product. Product information 62 is depicted on second side 12*b* of tag portion 12.

Thus, a UPC identification device has been disclosed. It will be appreciated that further variations and modifications thereof may be made within the scope of the invention as defined in the appended claims.

I claim:

1. A UPC identification device for affixation to a product comprising:

a label-bearing portion having a side bearing UPC information;

a tail portion fixed to said label-bearing portion and extending outwardly therefrom for attaching the identification device to a product, wherein said tail portion includes an expanded portion which is formed after the identification device is passed through a portion of the product to prevent escape from the product, and wherein said expanded portion is formed by a method taken from the group of expansion methods consisting of heating, crimping, flaring, and spreading; and wherein said label-bearing portion and said tail portion are substantially planar structures when attached to an object.

2. The device of claim 1 wherein said tail portion has a uniform size along the length thereof.

3. The device of claim 2 wherein said tail portion has a reduced size at a distal end thereof, and wherein said reduced size portion is about one-quarter the length of said tail portion.

4. A UPC identification device for affixation to a product comprising:

a label-bearing portion having a generally rectangular, planar form, and having a side bearing UPC information; and a tail portion fixed to said label-bearing portion and extending outwardly from a side thereof for attaching the identification device to a product, wherein said tail portion has a reduced size at a distal end thereof and an expanded portion which is formed after the identification device is passed through a portion of the product to prevent escape from the product, and wherein said expanded portion is formed by a method taken from the group of expansion methods consisting of heating crimping, flaring, and spreading; and wherein said label-bearing portion and said tail portion are formed as a unitary structure.

5. The device of claim 4 wherein said tail portion has a uniform size along the length thereof and an expanded portion which is formed after the identification device is passed through a portion of the product to prevent escape from the product.

6. The device of claim 5 herein said expanded portion is formed by a method taken from the group of expansion methods consisting of heating, crimping, flaring, and spreading.

7. The device of claim 4 wherein said tail portion includes a first tail portion and a second tail portion, which form an opening therebetween for passing said label-bearing portion therethrough, and wherein said reduced size portion is about one-quarter the length of said tail portion.

8. A UPC identification device for affixation to a product comprising:

a label-bearing portion having a generally rectangular, planar form, and having a side bearing UPC information; and a tail portion fixed to said label-bearing portion and extending outwardly from a short side thereof for attaching the identification device to a product wherein said label-bearing portion and said tail portion are formed as a unitary structure wherein said tail portion has a uniform size along the length thereof and an expanded portion which is formed after the identification device is passed through a portion of the product to prevent escape front the product.

9. The device of claim 8 wherein said expanded portion is formed by a method taken from the group of expansion methods consisting of heating, crimping, flaring, and spreading.

10. The device of claim 8 wherein said tail portion has a reduced size at a distal end thereof and an expanded portion which is formed after the identification device is passed through a portion of the product to prevent escape from the product, and wherein said reduced size portion is about one-quarter the length of said tail portion.

11. The device of claim 8 wherein said expanded portion is formed by a method taken from the group of expansion methods consisting of heating, crimping, flaring, and spreading.

* * * * *